United States Patent

Robinson

(10) Patent No.: US 8,208,478 B2
(45) Date of Patent: Jun. 26, 2012

(54) COMMUNICATIONS SYSTEM FOR AN UNDERWATER FLUID EXTRACTION FACILITY

(75) Inventor: Gerald Ian Robinson, Bristol (GB)

(73) Assignee: Vetco Gray Controls Limited, Nailsea, Bristol (GB)

( * ) Notice: Subject to any disclaimer, the term of this patent is extended or adjusted under 35 U.S.C. 154(b) by 133 days.

(21) Appl. No.: 12/377,372

(22) PCT Filed: Jul. 3, 2007

(86) PCT No.: PCT/GB2007/002479
§ 371 (c)(1),
(2), (4) Date: Feb. 12, 2009

(87) PCT Pub. No.: WO2008/020152
PCT Pub. Date: Feb. 21, 2008

(65) Prior Publication Data
US 2010/0202463 A1    Aug. 12, 2010

(30) Foreign Application Priority Data
Aug. 17, 2006   (GB) .................................. 0616328.1

(51) Int. Cl.
*H04L 12/28* (2006.01)
*G01V 3/00* (2006.01)
(52) U.S. Cl. ..................... 370/400; 370/401; 340/853.1; 340/853.3
(58) Field of Classification Search .................. 370/400, 370/401, 407; 166/339, 344; 340/853.1, 340/853.7, 854.7, 853.3
See application file for complete search history.

(56) References Cited

U.S. PATENT DOCUMENTS

| | | | | | |
|---|---|---|---|---|---|
| 4,701,756 | A | * | 10/1987 | Burr | 340/2.81 |
| 5,956,165 | A | * | 9/1999 | Fee et al. | 398/78 |
| 6,850,173 | B1 | * | 2/2005 | Steinbrecher | 340/984 |
| 7,234,524 | B2 | * | 6/2007 | Shaw et al. | 166/304 |
| 2003/0185570 | A1 | * | 10/2003 | Hayee et al. | 398/97 |
| 2004/0262008 | A1 | | 12/2004 | Deans et al. | |
| 2007/0107903 | A1 | * | 5/2007 | Baggs | 166/344 |
| 2010/0008371 | A1 | * | 1/2010 | Brekke et al. | 370/401 |

FOREIGN PATENT DOCUMENTS

GB    2396086 A    6/2004

OTHER PUBLICATIONS

Horiuchi Y et al., "Data Transport System Architecture for Scientific Submarine Cable," Scientific Use of Submarine Cables and Related Technologies, 2003, The 3rd International Workshop on Jun. 25-27, 2003, Piscataway, NJ, USA, pp. 185-190.

* cited by examiner

*Primary Examiner* — Robert Scheibel
*Assistant Examiner* — Saba Tsegaye
(74) *Attorney, Agent, or Firm* — Bracewell & Giuliani LLP

(57) ABSTRACT

A system for enabling communication between an underwater fluid extraction facility and a remote location comprises a fiber-optic cable connected between the facility to the remote location, signal transmission means at the remote location for transmitting signals to the fiber-optic cable, a distribution hub for receiving signals from the other end of the cable and at least one secondary hub located at the facility in communication with the distribution hub. Communication between the facility and the remote location is effected using a Local Area Network. Preferably Ethernet signalling is used throughout the network.

12 Claims, 4 Drawing Sheets

COMMUNICATIONS SYSTEM FOR AN UNDERWATER FLUID EXTRACTION FACILITY

RELATED APPLICATION

This application claims priority to PCT application PCT/GB2007/0002479 filed Jul. 3, 2007, which claimed priority to British patent application GB 0616328, filed Aug. 17, 2006.

BACKGROUND OF THE INVENTION

1. Field of the Invention

This invention relates to a system for enabling communication between an underwater fluid extraction facility and a remote location.

2. Description of Related Art

Known underwater fluid extraction and production systems typically utilise a bus communication system to pass control signals between a remotely located control station, for example a surface station, and an underwater facility, for example a subsea hydrocarbon extraction field. In such systems, control modules at the facility are connected to a communications umbilical in a multi-drop arrangement, the umbilical leading to the surface station. This has worked well in so far, as the communications load has been limited to, for example, opening or closing a valve at the facility occasionally and reporting temperatures, pressures and other simple measurements, typically once per minute. However, with the advent of more sophisticated sensors the multi-dropped bus system is no longer adequate.

Typically a subsea fluid extraction field is split up into a number of templates, each supporting a group of wells. In traditional production control systems, each template is operated via its own dedicated circuit in the umbilical cable bundle, running with a data rate between 1.2 and 19.2 Kbps. Currently there is a tendency for offshore well fields to be a substantial distance away from the control station, typically greater than 100 km, with communication being effected via an umbilical housing fibre optic cables. The fibre optic link between the shore and the field typically runs at a minimum of 4 Mbps and may be as fast as 2.49 Gbps. It therefore makes sense to combine the circuits, by multiplexing, into a single high data rate channel to take advantage of the higher link speed.

There are a number of approaches to multiplexing, but in existing systems, typically, each circuit has a dedicated channel which is allocated a specified time slot in a time division multiplexing system. This is known as a 'virtual' channel. Typically the ports are taken to a router which multiplexes their data to a single high rate signal which is passed to a 'long haul' optical modem. At the remote end, the signal is demultiplexed to reclaim the individual channels, which are then passed to modems for onward transmission to the appropriate template.

FIG. 1 illustrates a typical 'virtual channel' system, whereby a shore-based master control station (MCS) 1 connects to a data router and packetiser 4 via RS 422 interfaces 2 and 3. The packetiser 4 includes a fibre optic modulator driving an optical fibre 5. The modulated light signal is converted back to an electrical signal at the other end of the fibre 5, at a second data router and packetiser 6. This outputs digital packages via RS 422 interfaces 7 to high-speed copper modems (HSCM) 8, and then onto the appropriately addressed templates. Each template is connected to a number of subsea electronic modules (SEM) mounted on well trees (not shown in FIG. 1), which thus receive control data and return monitoring data.

The virtual channels created are full duplex, independent and isolated from each other. Communication signals at the MCS in this system cannot be distinguished from those in a system where the MCS drives the modems locally, so it provides a way of concentrating a number of long-haul signals onto a single fibre while using conventional subsea distribution techniques and protocols. The virtual channel approach was developed to support the conventional production control system architecture of a MCS communicating with a group of well tree mounted SEMs, multi-dropped on a single umbilical. Each of the systems is allocated the same bandwidth and third party sensor equipment is either integrated into the control system or a transparent channel is provided to allow communication between the sensor and its topside control unit. It has served the industry well in the past but subsea sensor systems are becoming more intelligent and demanding sufficient bandwidth to justify direct connection to the communications distribution network. Typical of this increased demand is the requirement to include real time video in the data stream.

SUMMARY OF THE INVENTION

It is an aim of the present invention to overcome this problem by replacing a conventional subsea communication distribution system by a Local Area Network (LAN) to enable handling of the much increased data to and from modern well complexes.

A LAN is a packet switched network, in which data from a number of sources is split into small packets, given a source and destination address and connected to a common circuit which is connected by routers, etc. to all the destinations. Packets all run at the full data rate and bandwidth is apportioned by the rate at which users place messages on the network.

It has been determined that the most, appropriate architecture and protocol suite combination is a wide area network (WAN) based on Ethernet, with alternatives for inter-template communication of either a star or a ring configuration or a combination of both. Currently the optimum Ethernet standard is 10 Base (10 MHz) since commercial system components are available to enable operation over fibre optic cable distances in excess of 600 Km. When 100 Base system components become available to handle such distances, this standard is likely to be adopted since 10 Base will then threaten to become obsolete. The common transport/network layer protocol combination is transmission control protocol/internet protocol (TCP/IP) in line with the intelligent well interface standard (IWIS) requirements.

The primary advantage of the LAN over the virtual system is that the flexibility provided in handling the quantity of data now required for modern wells.

The existing virtual channel multi-drop architecture is based on a range of products developed by the manufacturers of production well control systems. Although, open standards are often used, everything is specific to the application (i.e. production control systems) and cannot be purchased off the shelf. LANs are based on well known standards, which define all aspects of them and as a result can be built up from commercial units such as modems, routers, bridges, switches etc. Industrial Ethernet components, which now feature high reliability and wide temperature ranges, are readily available at reasonable cost, so that it is now realistic to use this technology in subsea control systems.

In accordance with the present invention there is provided a system as set out in the accompanying claims.

For example, an example of a system for enabling communication between an underwater fluid extraction facility and a remote location, is provided. The exemplary system includes communications carrying means connected between the facility to the remote location, signal transmission means at the remote location for transmitting signals to a first end of the communications carrying means, and a distribution hub located at the facility for receiving signals from a second end of the communications carrying means and at least one secondary hub located at the facility. Communication between the facility and the remote location is effected using a Local Area Network. The at least one secondary hub is in communication with the distribution hub so that signals from the second end of the communication carrying means received by the distribution hub are output from the distribution hub to the at least one secondary hub. The at least one secondary hub is correspondingly connected to a subsea electronics module for a fluid extraction means for Ethernet communication therewith. The subsea electronics module can include an Ethernet hub for linking, the subsea electronics module to the secondary hub connected thereto, data acquisition and control electronics, and an Ethernet enabler interfacing with the data acquisition and control electronics and connected to the Ethernet hub.

BRIEF DESCRIPTION OF THE DRAWINGS

The invention will now be described with reference to the accompanying drawings, in which.

DETAILED DESCRIPTION

Figure 1:
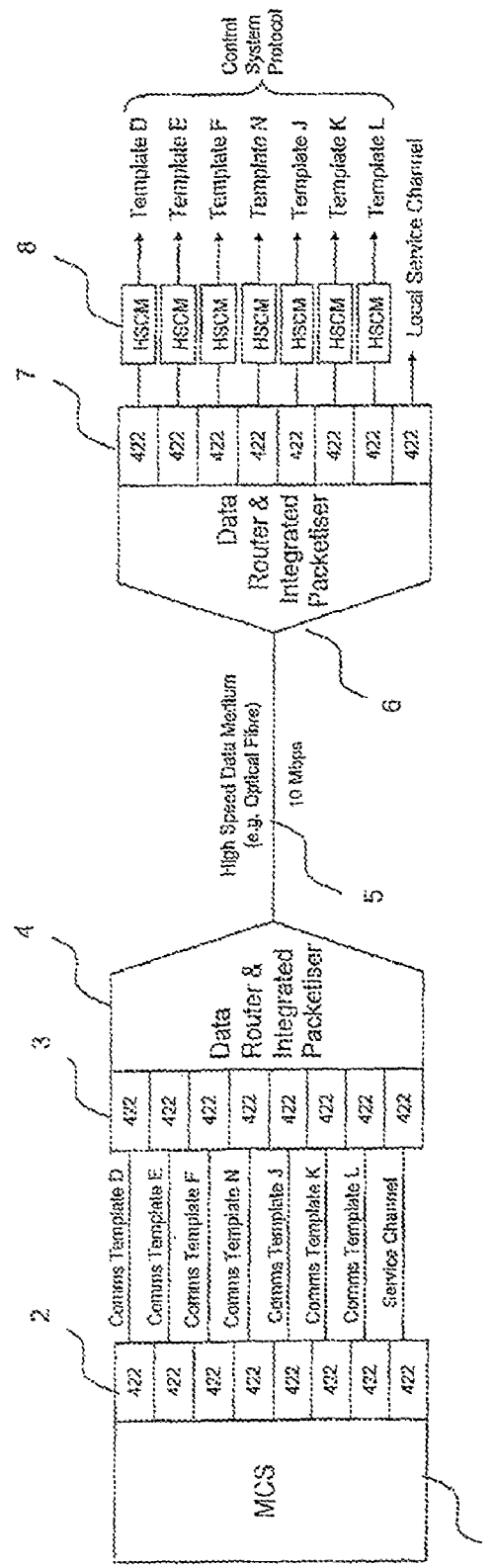
FIG. 1 illustrates a typical conventional 'virtual channel' system.
Figure 2:
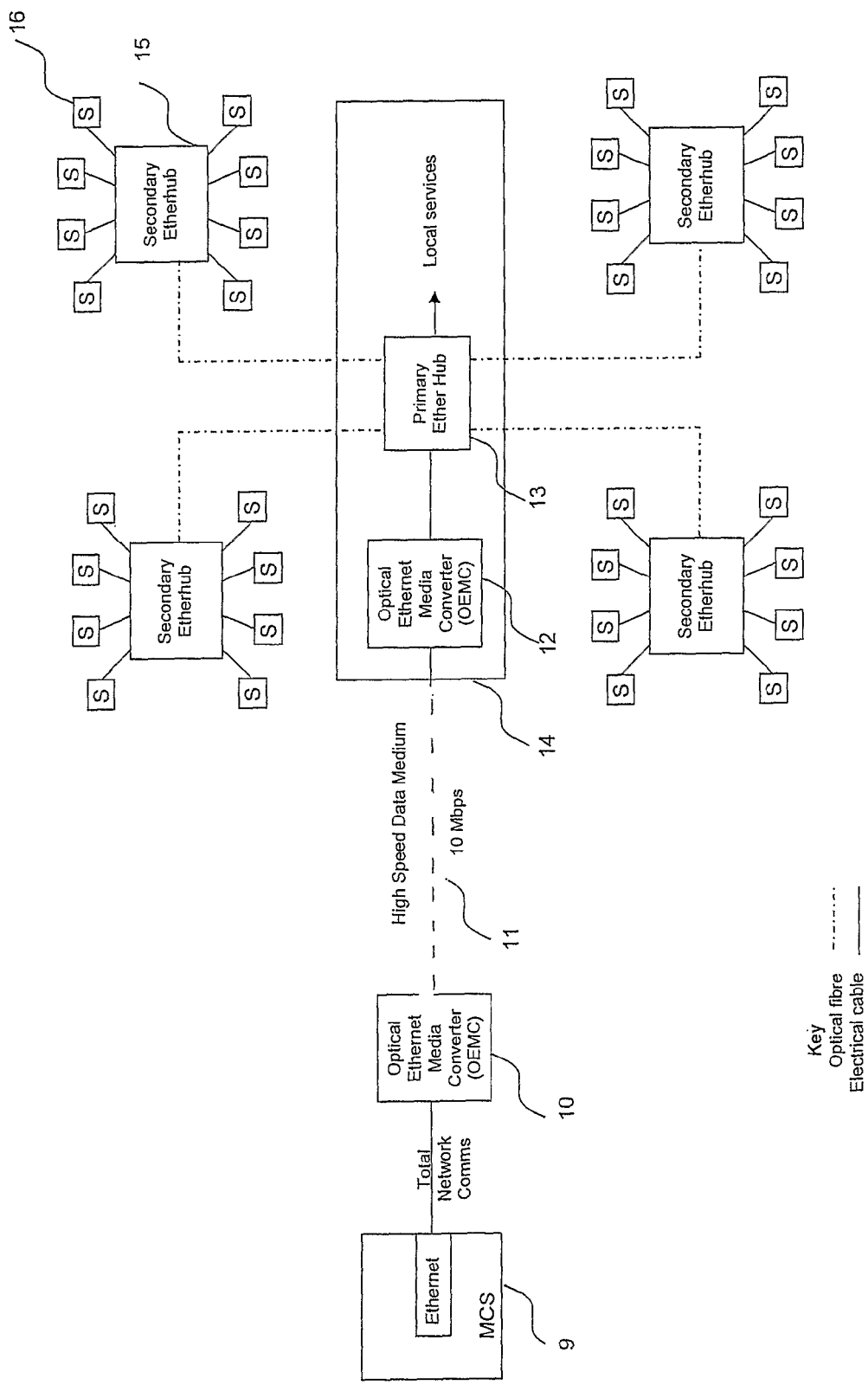
FIG. 2 shows, a LAN-based "star configuration" subsea communication distribution system in accordance with the present invention.

A first embodiment of the present invention is shown in FIG. 2 which uses a star configuration system to provide a communication link between a shore-based MCS 9 and a plurality of SEMs 16 located at respective well trees, via subsea templates. The MCS 9 contains Ethernet circuitry necessary to drive an optical Ethernet media converter (OEMC) 10. This delivers optically modulated digitised data packages to a communications carrying means, in this case a fibre optic cable 11, located in an umbilical which can typically be up to about 600 km long. Connected to the other end of the fibre optic cable 11 is a second OEMC 12 which outputs electrical digitised data packages to a primary Ethernet distribution hub 13. Both the OEMC 12 and the primary Ethernet hub are conveniently housed in a subsea distribution unit 14. The primary Ethernet hub 13 outputs to the appropriate required number of secondary Ethernet hubs 15, i.e. templates, in a star configuration, of which four are shown by way of example. This output may, as shown, be via fibre-optic cable. Each secondary Ethernet hub 15 feeds an SEM 16 on each well tree.

Figure 4:
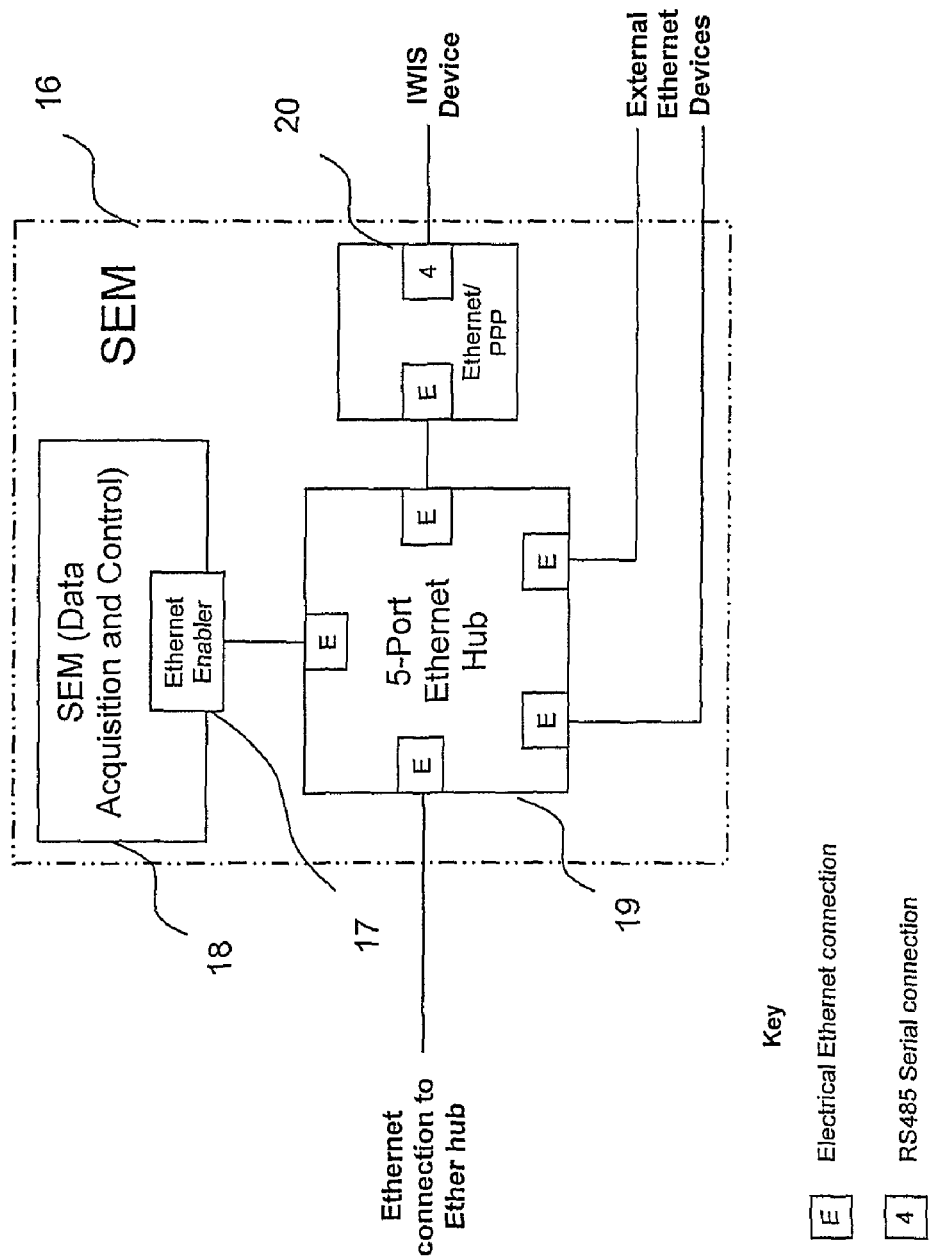
FIG. 4 shows a LAN configuration within an SEM.

Existing designs of SEMs typically interface via a modem. FIG. 4 however shows a LAN configuration within a SEM in which the modem is replaced by an Ethernet enabler 17, which interfaces with existing SEM data acquisition and control electronics 18. An Ethernet hub 19 is required to link both to the template secondary Ethernet hubs and to a point-to-point protocol (PPP) converter 20. The converter 20 connects in turn to an interface, for example an RS 485 serial interface, to communicate with any devices that utilise an intelligent well interface standard (IWIS).

Figure 3:
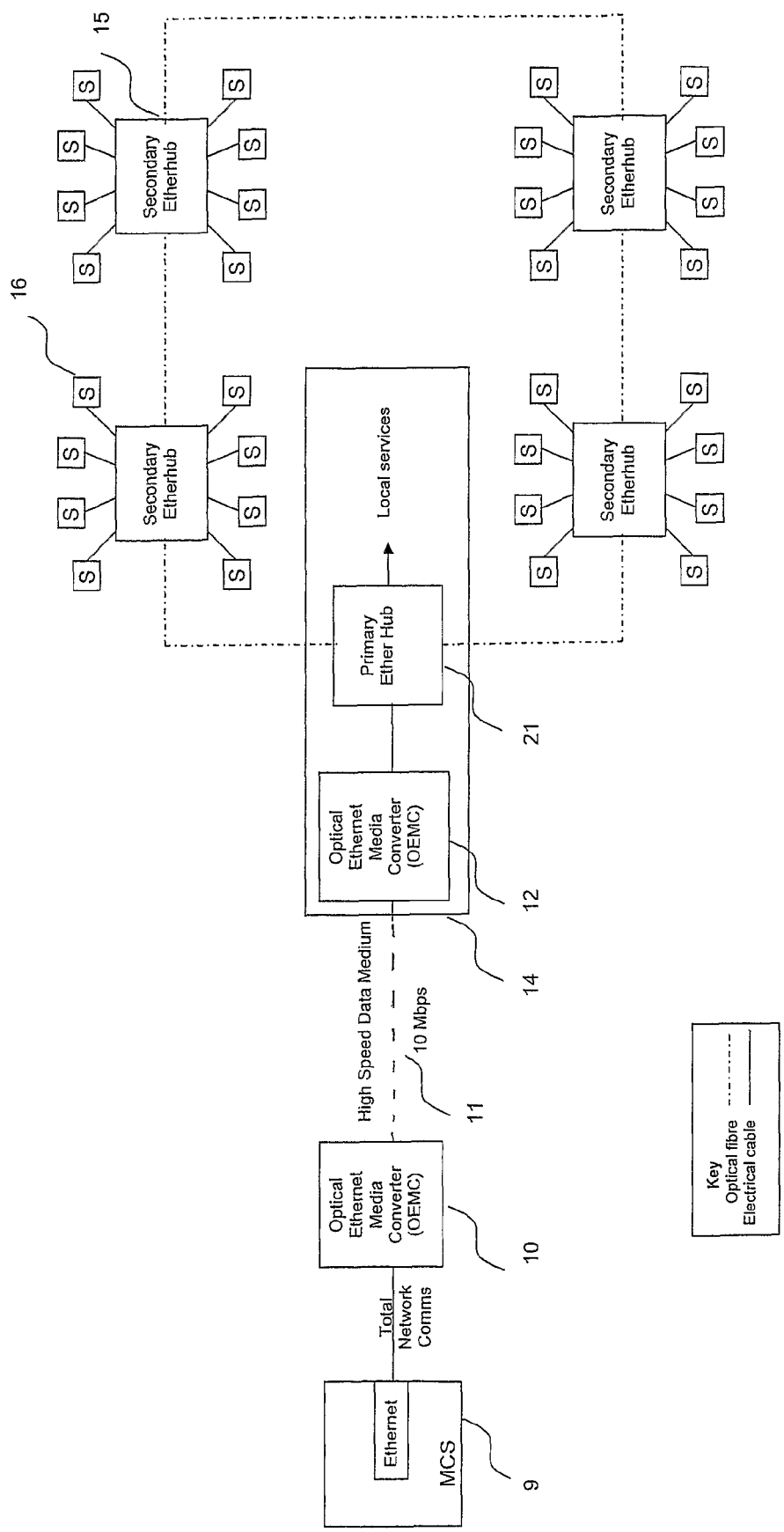
FIG. 3 shows a LAN-based "ring configuration" subsea communication distribution system in accordance with the present invention.

FIG. 3 shows an alternative embodiment using a ring configuration to provide a communication link between a shore based MCS and SEMs located at each well tree, via subsea templates. From the MCS 9 to the primary Ethernet hub 21, the configuration is the same as for FIG. 2. However, in this embodiment the primary Ethernet hub 17 is connected to secondary Ethernet hubs 15 in a ring configuration with the hubs 15 connected to the well tree located SEMs 16.

For fluid extraction fields with a small number of wells, the star configuration is likely to be the most cost-effective arrangement, whereas those with a large number of wells and templates, the ring configuration may be more attractive. Typically the umbilical from the shore terminates at a subsea umbilical termination unit, which distributes power and communication to each template and thus each well. The subsea umbilical termination unit typically incorporates connectors and couplers only, with the required electronics being housed in a retrievable subsea distribution unit. For example, this subsea distribution unit normally houses a data router and integrated packetiser, and high-speed copper modems of the traditional 'virtual channel' and would therefore be a suitable location to house the OEMC and primary hub of the LAN system replacing it.

The systems illustrated are normally duplicated to provide dual redundancy and thus greater availability in the field, but for simplicity this is not shown in the figures.

Many other alternatives are possible within the scope of the claims, and the above-described embodiments are exemplary only. For example, other signal formats and protocols may be used as required for communication within the network and with external devices.

Although in the embodiments described the communications carrying means comprises a fibre-optic cable, this need not be the case. For example, for short-range, low cost systems, it may be preferable to use a high-speed copper modem link. In this case, further electronics would be needed to deal with the disparity in data rates between the systems.

The invention claimed is:

1. A system for enabling communication between an underwater fluid extraction facility and a remote location, comprising:
communications carrying means connected between the facility to the remote location;
signal transmission means at the remote location for transmitting signals to a first end of the communications carrying means; and
a distribution hub located at the facility for receiving signals from a second end of the communications carrying means and at least one secondary hub located at the facility, wherein communication between the facility and the remote location is effected using a Local Area Network, and the at least one secondary hub is in communication with the distribution hub so that signals from the second end of the communication carrying means received by the distribution hub are output from the distribution hub to the at least one secondary hub and the at least one secondary hub is connected, for Ethernet communication therewith to a subsea electronics module for a fluid extraction means, the subsea electronics module comprising:

an Ethernet hub for linking the subsea electronics module to the secondary hub connected thereto, data acquisition and control electronics, and an Ethernet enabler interfacing with the data acquisition and control electronics and connected to the Ethernet hub.

2. A system according to claim 1, wherein the or each secondary hub is linked directly to the distribution hub.

3. A system according to claim 1, wherein the at least one secondary hub is linked to at least one other secondary hub.

4. A system according to claim 1, wherein the communications carrying means comprises a fibre-optic cable.

5. A system according to claim 1, wherein the communications carrying means comprises a copper modem link.

6. A system according to claim 1, wherein the signals transmitted through the communications carrying means are in an Ethernet format.

7. A system according to claim 6, wherein the signal transmission means comprises a converter for converting electrical input communications signals into Ethernet format suitable for transmission through the communications carrying means.

8. A system according to claim 6, wherein the distribution hub comprises a converter for converting the signals received from the communications carrying means into electrical signals in the Ethernet format.

9. A system according to claim 1, wherein the at least one secondary hub is connected to a plurality of such subsea electronic modules.

10. A system according to claim 9, wherein the fluid extraction means comprises a well tree.

11. A system according to claim 9, wherein the or each subsea electronics module comprises means for converting Ethernet signals received from the distribution hub to signals of a different format.

12. A system according to claim 1, wherein the at least one secondary hub is a plurality of secondary hubs, and wherein each respective secondary hub is connected to a plurality of such subsea electronics modules.

\* \* \* \* \*